Jan. 9, 1940.   W. E. URSCHEL ET AL   2,186,084
SLITTING MACHINE
Filed April 29, 1938   4 Sheets-Sheet 4

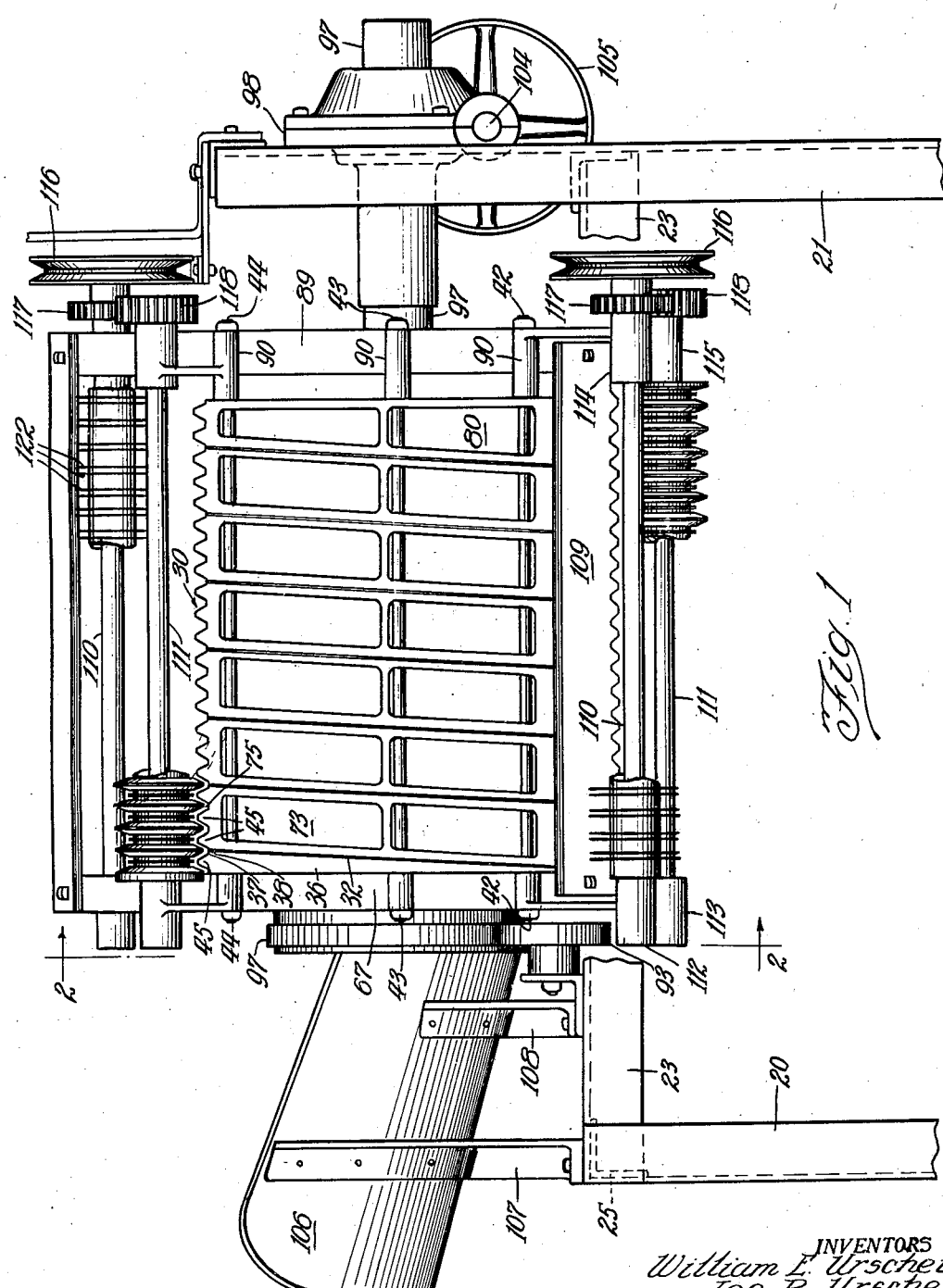

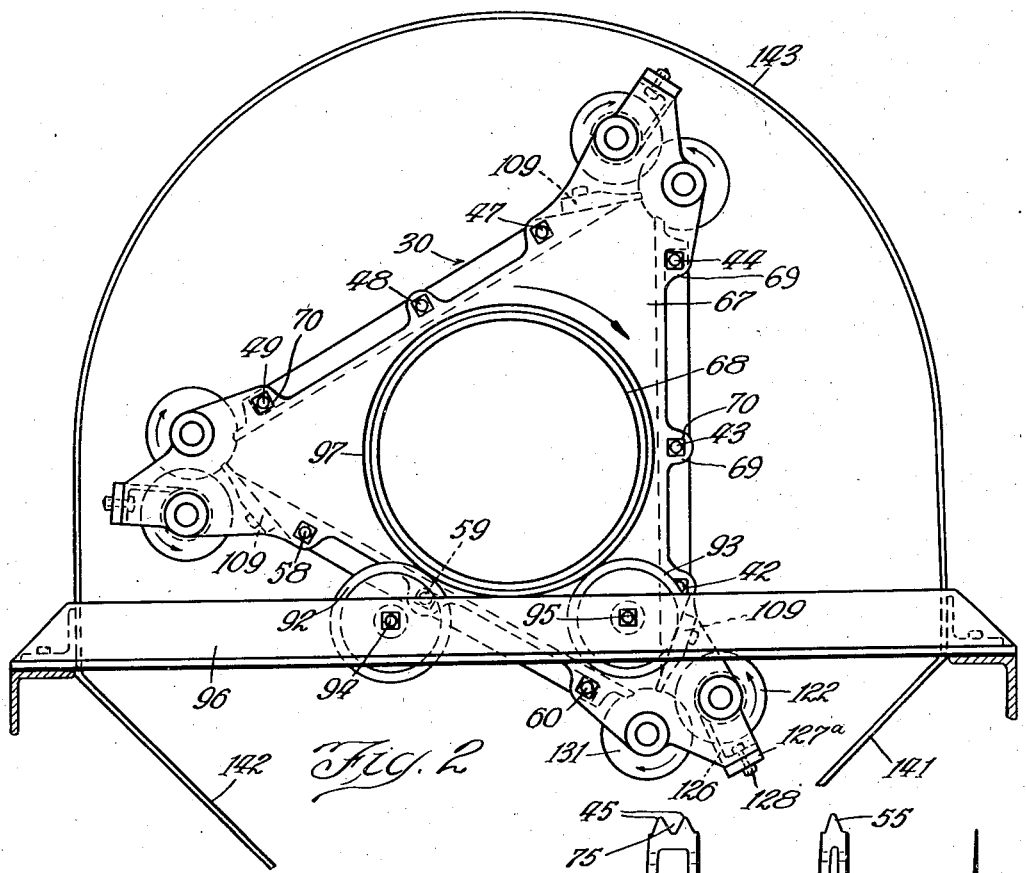
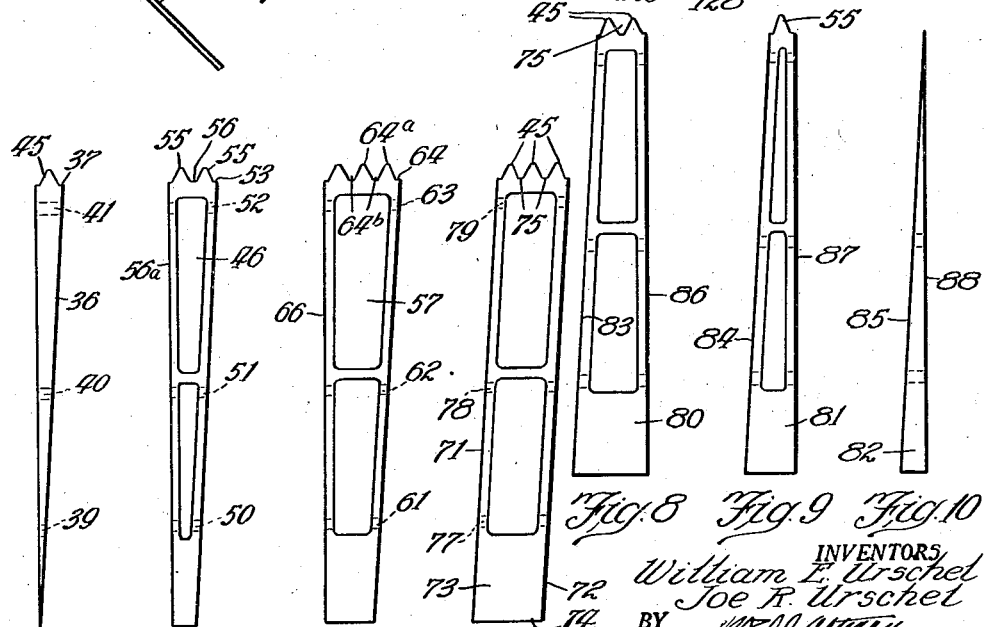

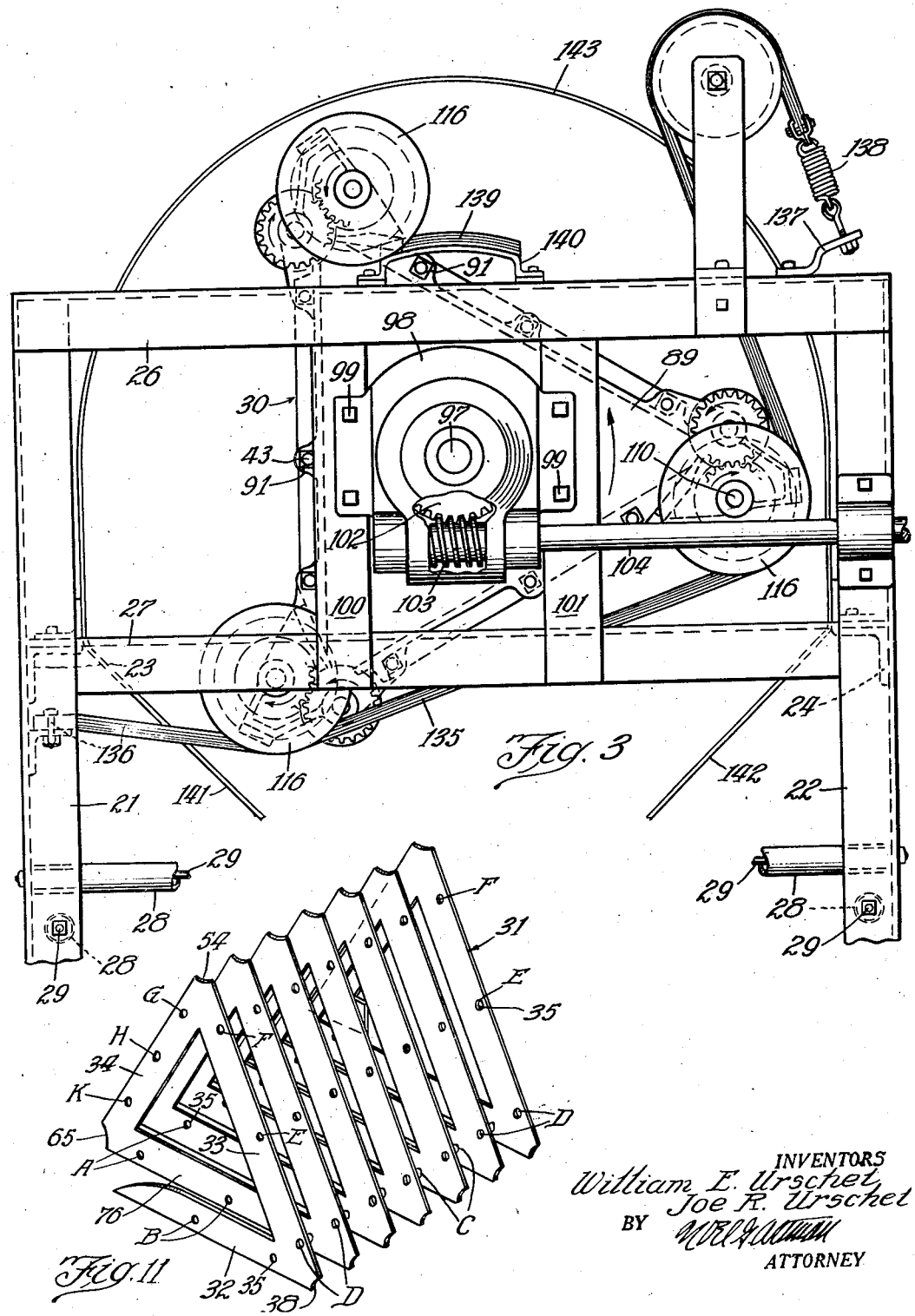

INVENTORS
William E. Urschel
Joe R. Urschel
BY
ATTORNEY

Patented Jan. 9, 1940

2,186,084

UNITED STATES PATENT OFFICE 2,186,084

SLITTING MACHINE

William E. Urschel and Joe R. Urschel, Valparaiso, Ind.

Application April 29, 1938, Serial No. 204,957

10 Claims. (Cl. 146—98)

This invention relates to slitting machines and has to do particularly with a machine for slitting green bean pods or the like.

Heretofore difficulty has been encountered in constructing a machine which will with regularity divide green bean pods into strips coextensive in length with such pods. Ordinarily the pods are curved and, as a consequence, the slitting instrumentalities of earlier apparatus have been unadapted to uniformly traverse the pods throughout their entire length. This mode of treatment has resulted in a product consisting mostly of strips cut diagonally of the pods, such strips usually being short and of varying cross-sectional area because of one or more long-pointed tapered ends. These diagonal cuts when made near the ends of pods effect extra short pieces or strips not at all conforming to the desired shape. Prior machines have, therefore, resulted in a product in which the constituent particles differ in various degrees from the shape preferred.

The primary object of the present invention is the provision of an improved slitting machine which is adapted to cut from longitudinal severable articles as green bean pods strips extending throughout their entire length, irrespective of whether the articles are straight or curved.

Another object is the provision of a new rotatable hopper for feeding articles to a slitting mechanism rotatable therewith.

Another object is the provision of a novel combination of hopper and slitting mechanism which maintain articles in a selected position with respect to said slitting mechanism while an operation is performed on such articles.

Still another object is the provision of a rotatable hopper having a plurality of outlets through which articles therein are successively presented, and slitting instrumentalities respectively associated with each of the outlets.

A further object of this invention is the provision of an improved slitting mechanism having first a receptive movement and then an ejective movement thus enabling the mechanism to clear itself of articles improperly fed thereto or otherwise unsuited for treatment thereby.

Additional objects and advantages of the invention will become apparent upon reading the following description with reference to the accompanying four sheets of drawings comprising a part of this specification, and wherein:

Fig. 1 is a side elevation of the preferred embodiment of the invention with the hood removed and parts of the machine broken away for clarity;

Fig. 2 is a sectional view directed rearwardly of the machine and taken on the line 2—2 of Fig. 1;

Fig. 3 is a rear elevational view of the machine;

Figs. 4 to 10 are views displaying the outer sides of the side wall members fabricatable into the side walls of the rotatable hopper shown in Fig. 1;

Fig. 11 is a perspective view of a spiricular piece adapted to be co-assembled with members as those shown in Figs. 4 to 10 into a rotatable hopper as that shown in Fig. 1 and having spaced spirally arranged ribs formed by said piece;

Figure 14:
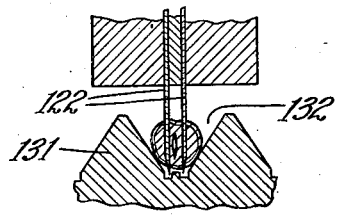
Fig. 14 is an enlarged sectional view taken transversely through a bean pod and axially through slitting instrumentalities operating thereon.

Reference characters where used in the following description always refer to the same part whether shown in one or several figures of the drawings.

The machine is supported upon a frame including upright leg members 20, 21 and 22, Figs. 1 and 3. Upper end sections of legs 20 and 21 are joined by a side piece 23. Leg 22 and a leg (not shown) paired with leg 20 at the front end of the machine are joined by a side piece 24, Fig. 3, corresponding to side piece 23. The upper ends of front leg 20 and the front leg (not shown) paired therewith are joined by an end piece 25. At the back end of the machine the upper ends of legs 21 and 22 are connected by a cross piece 26. A second cross piece 27 extends between legs 21 and 22 a short distance below cross piece 26. The frame is further strengthened by leg braces comprising tubular compression members 28 extending selectively between paired legs, tension members 29 within the members 28, and nuts threaded upon the ends of said tension members to draw the legs firmly against the ends of tubular members 28 associated therewith.

The present embodiment of the invention is built about a rotatable hopper indicated generally at 30 in Figs. 1, 2, and 3. Said hopper 30 is triangular in transverse section and is rotatable about its principal axis which is placed in the horizontal. Figs. 4 through 11 show a plurality of interfabricatable parts which when assembled make up the hopper side walls.

That part of the hopper shown in Fig. 11 consists of a spiricular member 31 made of flat stock and having three straight sections as 32, 33, and 34 for each revolution. In the assembled device the straight sections as 32, 33, and 34 project inwardly from the inner periphery of the hopper and thus provide a plurality of spaced-apart ribs which are effective during rotation of the hopper to advance axially thereof articles contained therein. Each straight section as 32, 33, and 34 is provided with apertures 35 arranged in sets of which the individual apertures are axially aligned for receiving rods as presently explained. Section 32 of member 31 is adapted to receive upon its outer face the side wall member 36 shown in Fig. 4. The pointed end of side wall member 36 projects beyond the free end of straight section 32 while the shoulder 37 thereof aligns with the arcuate notch 38 at the apex of adjoining straight sections 32 and 33 (see Figs. 1 and 11). Apertures 39, 40, and 41, respectively, register with sets A, B, and C of aligned apertures 35, Fig. 11. The right side of section 36, as illustrated in Figs. 1 and 11, is formed at an angle with respect to the left side so as to lie flatly against straight section 32 of the spiricular member 31 while the left side of said section lies in a plane normal to the axis of the member 31 and the hopper 30. Rods 42, 43, and 44 having threaded end sections are inserted through the apertures 35 in sets A, B, and C of the spiricular hopper member 31 and through the apertures 39, 40 and 41 of side wall member 36 to retain the member 36 in place upon the spiricular member 31. One end of side wall member 36 has a single tongue 45.

Hopper side wall member 46 is secured to the exposed broad face of the straight section 33, Fig. 11, of the spiricular member 31 by means of rods 47, 48, and 49, Fig. 2, which extend through holes 50, 51, and 52 of said side wall member and through the aligned holes 35 which are further designated D, E, and F in the spiricular member. The straight cut end of hopper side wall member 46 is thus arranged in spaced relation with the end of member 36 bearing the tongue 45, while the shoulder 53 of member 46 is in alignment with the curved notch 54 in member 31. Tongues 55 and a notch 56 therebetween are formed upon an end of hopper side wall member 46. Said side wall member has a long edge 56a which is disposed within the same plane transversely of the hopper as is the left edge of side wall member 36. A third hopper side wall member 57 is attached to straight section 34 of the spiricular member 31 by means of rods 58, 59, and 60, Fig. 2, which extend lengthwise of the hopper through the aligned holes 35 consisting of sets G, H, and K, and through the holes 61, 62, and 63 in said side wall member. The straight cut end of side wall member 57 will then be placed in opposed spaced relation with the tongue and notched end of side wall member 46 while the shoulder 64 on the opposite end thereof aligns with the curved notch 65 in the spiricular member 31. Tongues 64a and grooves 64b are formed upon an end of side wall member 57 adjacent to the shoulder 64. The left edge 66 of hopper side wall member 57 falls in the same transverse hopper plane as the corresponding edges of side wall members 36 and 46. Hence, such edge of the three members 36, 46, and 57 are each engaged by the inner face (near its edge) of a triangular hopper end plate 67. End plate 67 constitutes the front end of the hopper 30 and has a large central opening 68 through which untreated articles are fed into the hopper. Three bosses 69 are provided on each side of the end plate 67, said bosses being apertured for receiving the rods as 42, 43, and 44. Nuts 70 are threaded onto the ends of the rods as 42, 43, and 44 to hold the parts in assembly.

The two long edges 71 and 72 of hopper side wall member 73 are parallel with one another but oblique with respect to the two shorter edges. One of said short edges is straight as indicated at 74 and the other embodies tongues 45 and notches 75. The long parallel sides 71 and 72 of the side wall member 73 are fitted between and respectively against straight sections 32 and 76 of spiricular member 31; see Figs. 1 and 11. The short straight edge 74 of the member 73 is in substantially opposed relation with the notched end of the member 57 but spaced therefrom. Said side wall member 73 contains holes 77, 78, and 79 which receive the rods 42, 43, and 44 and is thus held in fabricated relation upon the hopper. Following hopper side wall member 73 is a series of similar members with parallel long edges, the members in such series being placed with their straight ends in substantially opposed spaced relation with the tongue and notched ends of the preceding members. This progression of side wall members continues until the back end of the hopper is approached when the three members with long edges disposed at such back end will be formed with those edges at such an angle that they will lie in a single plane transversely of the hopper axis. Said three members are shown in Figs. 8, 9, and 10 and are designated 80, 81, and 82. Edges 83, 84, and 85 of the members 80, 81, and 82 are placed against their respective straight sections of the spiricular member 31, while the opposite sides 86, 87 and 88 thereof align in a plane at right angles to the hopper axis. The side wall members 80, 81, and 82 are provided with holes for receiving the rods as 42, 43 and 44 in like manner as the previously described side wall members.

An end plate 89, Figs. 1 and 3, similar to end plate 67 is placed upon the back end of the hopper against the aligned edges 86, 87, and 88 of the side wall members 80, 81, and 82. End plate 89 has apertured bosses 90 which receive the rods as 42, 43, and 44. Nuts 91 are threaded onto the back ends of the rods as 42, 43, and 44.

The rotatable hopper 30 is supported at its front end by a pair of rollers 92 and 93 which are journalled upon stub shafts 94 and 95 anchored in a frame cross piece 96. Said rollers engage a circular track 97 upon a forwardly projecting section surrounding the opening 68 in the front end plate 67. Rotative movement is imparted to the hopper by a coaxial shaft 97 attached by means of a spider (not shown) to the back end plate 89. Shaft 97 is journalled in a bearing block 98 which is secured by means of bolts 99 to a pair of vertical frame supports 100 and 101. A worm gear 102 is non-rotatively secured to shaft 97 and is driven by a worm pinion 103 upon a drive shaft 104. Power is received by the machine from a pulley 105 which is non-rotatively connected with the shaft 104.

A feed chute 106, Fig. 1, is provided for directing untreated articles into the front end of the hopper. The chute 106 is supported in an inclined position by brackets 107 and 108 of graduated height.

It will be conceived from the description thus far of the rotatable hopper 30 that a longitudinal opening obtains along each of the three apices because of the spacing provided between the ends of the side wall members as 57 upon one side of the hopper and side wall members as 46 and 73 upon the other sides thereof. The tongues 45 and notches 75 of the side wall members shown in Fig. 1 form one side of a longitudinal hopper opening. Likewise, the aligned tongue and notched ends of the side wall members disposed on the other two sides of the hopper constitute one side of an axial opening. The opposite sides of these three openings extending lengthwise of the hopper are formed by tongue and notched edges upon bars 109 which are fastened to end plates 67 and 89 of the hopper. The tongues of bars 109 align with the tongues of the side wall members opposed thereto so that the opposed notches therebetween provide a series of hopper outlets. Such dimensions are selected for the notches that the outlets effected thereby will permit the endwise passage therethrough of bean pods or other elongated articles which have been placed in the hopper. Means for engaging the articles and slitting them lengthwise as they emerge from the hopper through the outlets will now be described.

The hopper 30 carries three units of slitting mechanism, one unit being associated with each axial row of outlets formed by the notches as 75 in the hopper side wall members as 73 and the notches in the bar 109 adjacent thereto. Each slitting mechanism comprises a plurality of slitting instrumentalities corresponding in number with the number of outlets at its respective apex of the hopper. The instrumentalities in each unit of mechanism are non-rotatively secured to rotatable shafts 110 and 111 which are journalled in bearings 112 and 113 in hopper end plate 67 and in bearings 114 and 115 in hopper end plate 89.

Each shaft 110 has a V-groove pulley 116 and a spur gear 117 secured to its back-most end section. The gears 117 are meshed with gears 118 on the adjacent shafts 111. The shafts 110 each carry a sleeve 119, Fig. 13, having a flange 120 at one end and a threaded section at the opposite end. Sleeves 119 are fixed to their respective shafts 110 by set screws 121. Disk knives 122 having central openings of substantially the same diameter as the sleeves 119 are slid in position over the threaded ends of such sleeves together with spacer rings 123 and 124. The knives 122 are arranged in pairs in registry with the hopper outlets associated therewith, the spacer rings 123 being of the proper width to correctly space the knives of each pair, and the spacer rings 124 being of the proper width to cause the knife pairs to register with their respective hopper outlets. A nut 125 upon the threaded end of each sleeve 119 serves complementally with the sleeve flange 120 to compress the knife and sleeve assembly tightly together.

Figure 12:
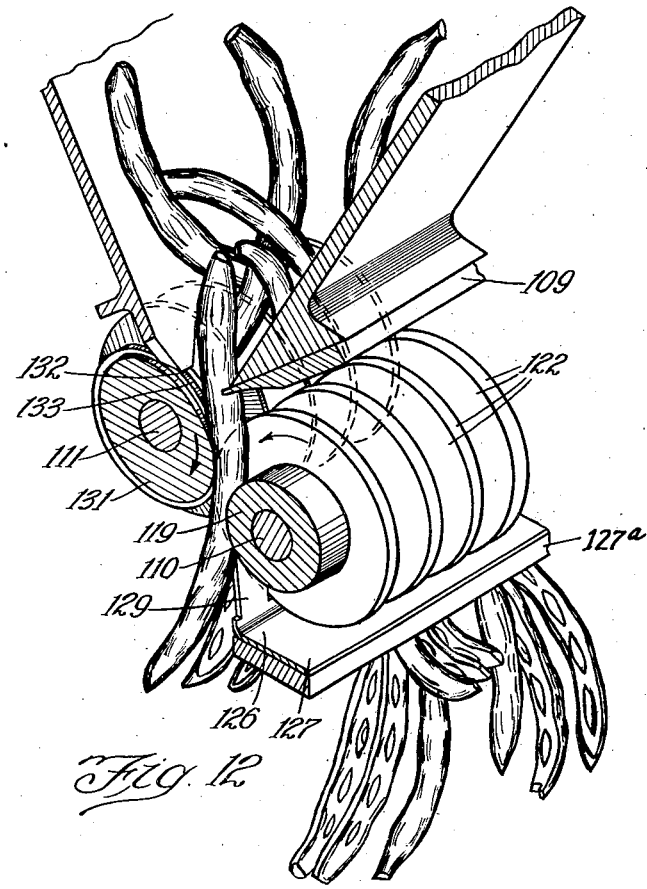
Fig. 12 is a fragmentary sectional view illustrating the manner in which longitudinal articles are withdrawn from the hopper by the slitting apparatus.
Figure 15:
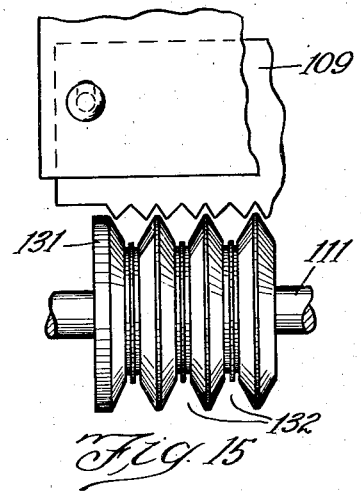
Fig. 15 is a fragmentary side view of a slitting mechanism feed roll and an associated adjustable feed plate on the rotatable hopper.
Figure 16:
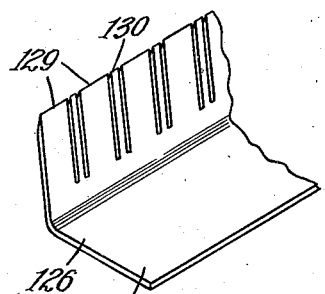
Fig. 16 is a fragmentary perspective view of an ejector member for removing the finished strips from the knives of the slitting mechanism.

A deflector plate 126 is associated with each unit of slitting mechanism; see Figs. 2, 12, and 16. The plates 126 are L-shaped in transverse section thus providing a foot portion 127 secured to a flat bar 127a which in turn is fastened to apices of the hopper end plates 67 and 89 by means of bolts 128, and an inwardly turned portion having tongues 129 and 130 which project between the slitting knives 122. During operation of the machine the tongues 129 and 130 strip the slit particles of bean pods or the like from between the knives and deflect such particles downwardly into a receiver therefor.

Figure 13:
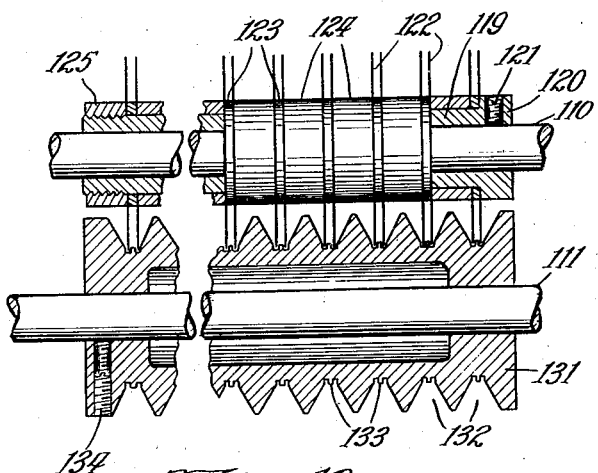
Fig. 13 is a partial sectional view showing the arrangement of disk knives and their cooperative grooved roller as employed in the slitting apparatus of the present machine.

That part of the slitting mechanism carried on each shaft 111 comprises a roller 131 having a series of circumferential grooves 132 which are positioned to receive the knives 122 in the manner illustrated in Figs. 2 and 13. Grooves 132 contain beads 133 in their bottoms, such beads being sufficiently high to extend inwardly between the paired knives associated therewith so as to perfect a clean cut of the pods when during operation of the machine they are directed into the grooves under and between the knives 122 as illustrated in Figs. 12 and 14. A set screw 134, Fig. 13, holds each roller 131 in fixed relation with its shaft 111.

Attention is next invited to Fig. 3 and more particularly to a belt 135 which is attached at one end to the machine frame by a bolt 136. A bracket 137 upon the machine frame serves as an anchorage for the opposite end of said belt. Tautness is maintained in the belt by a contraction spring 138. When the hopper 30 is rotated while the machine is in operation the grooved pulleys 116 of the several slitting mechanism units are successively carried along the belt 135 whereby the shafts 110 supporting the same are caused to rotate as well as the shafts 111 which are connected to shafts 110 through gears 117 and 118. While the pulleys 116 are traversing the belt 135 the rollers 131 and knives 122 associated therewith are rotated in the direction indicated by the arrows in Figs. 2 and 12, or in such direction as will cause the various instrumentalities of knives 122 and roller grooves 132 to have a bite for drawing therebetween bean pods or other longitudinal severable articles which have been fed endwise thereto through the hopper outlets. Subsequent to passing from engagement with the belt 135, however, the pulleys 116 frictionally engage a short arcuate piece 139 of belting so disposed with respect to the passing pulleys, upon a bracket 140, as to effect rotation of said pulleys in the opposite direction. Thus, while the knives 122 and rollers 131 are in their uppermost position, they rotate in the reverse direction to dislodge and eject therefrom backwardly into the hopper any articles that are too imperfect or too large or which for any reason are unqualified to pass through the slitting apparatus.

When the machine is started for operation, driving power will be applied to the drive shaft 104 in the proper direction for causing worm gear 102, Fig. 3, and the hopper 30 to rotate in the direction indicated by the arrow. Articles such as green bean pods which are to be divided into longitudinal strips are introduced into the front end of the hopper by means of the chute 106. The straight sections as 33 of the spiricular member 31 project inwardly from the inner periphery of the hopper sufficiently far to be effective for advancing the articles toward the back end of the hopper during its rotation. Said inwardly projecting sections of the spiricular member 31 have the effect of arranging the bean pods or other similarly shaped articles within the hopper transversely thereof and hence directed endwise toward the hopper outlets cooperatively formed by the notches in the edges of bars 109 and the ends of hopper side wall members as 73. While the pulley 116 of a slitting mechanism unit is traversing the belt 135 the articles in the hopper will be gravitationally urged toward the hopper outlets associated with such unit of slitting mechanism. The ribs effected by the straight sections as 76 of the member 31 will function at this time to guide the downwardly moving articles end foremost into said outlets and upon the articles projecting through the outlets they will be engaged between the adjacent pairs of disk knives and their cooperative grooves in the roller 131, and thus passed through the slitting mechanism incident to being divided into three strips. The beads 133 in the bottoms of the grooves 132 in roller 131 force the center section, which becomes one of the three strips, upwardly between the paired knives making the cut. Complete cuts through the articles are thus assured.

The slitting mechanism is so constructed and so coacts with the hopper as to straighten the articles while slitting them and in this way accurately place the cuts taken therethrough. The hopper outlets are small enough to steady the trailing portion of the articles while the leading portions are being passed under the knives 122 and within the roller grooves 132. This action is illustrated in Fig. 12. Fig. 14 clearly shows how the inclined sides of the roller grooves 132 have a tendency to center the articles therein and with respect to the paired knives.

Articles that fail to project through hopper outlets near the front end of the hopper are advanced rearwardly while being turbulated by rotation of the hopper and moved toward different outlets three times during each hopper revolution. If all of the articles are of a character adapting them to pass through the slitting mechanism, they will eventually all find outlets by the time of approaching the back end of the hopper. Should the charge of articles include some which are not adapted to be operated upon by the machine, or foreign articles similarly unadapted, these articles will eventually be discharged through the opening in back end plate 89. Should any of such irregular articles become lodged in the slitting mechanism, the retrograde movement of the latter while the pulley 116 thereof traverses the belting member 139, Fig. 3, will dislodge those articles and permit them to drop downwardly into the hopper.

The strip portions of the articles, and which are prepared while the units of slitting mechanism are in the lower part of their path of movement, are cleared from the knives 122 by the tongues 129 and 130 of plates 126 and deflected downwardly thereby between guide members 141 and 142 into a suitable receptacle or conveyor. A hood 143 is provided as a cover for the moving parts of the machine.

The flat interior surfaces of the hopper side walls form a series of troughs of which the bottoms correspond to the apices of the polygonal hopper. Each time the bottom of a trough is disposed downwardly, the articles will slide down the side walls thereof, end foremost, toward such bottom and the outlets therein. The capacity of the machine is increased by having a row of article outlets at the bottom of each trough and a like number of slitting mechanisms.

We claim:

1. A slitting machine for longitudinal articles, comprising a rotatable hopper, means for rotating said hopper, said hopper being adapted to contain a plurality of such articles and having an outlet toward which the articles are periodically moved during such rotation, said outlet being of such dimensions as to receive and permit projection of the end of an article thereinto only when such article is moved endwise thereto- ward, article extracting means movable with said hopper, said article extracting means being engageable with said articles when they are moved into said outlet and being operable to extract the thus engaged articles endwise outwardly of the hopper through such outlet, said extracting means including a knife disposed in position for severing the articles during the extraction thereof, and means for operating said extracting means.

2. A slitting machine for longitudinal articles, comprising a rotatable hopper, means for rotating said hopper, said hopper being adapted to contain a plurality of such articles and having an outlet toward which said articles are gravitationally and periodically moved, said outlet being of such dimensions as to enable it to receive only the end section of an article and then only when such article is moved endwise thereto ward, article extracting means movable with said hopper, said articles extracting means being engageable with said articles when they are projected into said outlet and being operable to extract the thus engaged articles outwardly of the hopper through such outlet, means for operating said extracting means, and a knife disposed exteriorly of and in registry with said outlet, said knife being arranged in close proximity to said outlet with its cutting edge facing said outlet and in such position as to sever said articles at a section in parallelism with their movement during extraction from said hopper.

3. In an article slitting machine, a movable hopper adapted to contain a plurality of articles to be slit and having an outlet, means for moving said hopper for agitating the articles therein to cause portions thereof to project through said outlet, cooperative knife and roller means adjacent to said outlet exteriorly of the hopper and carried thereon for movement therewith, said knife and roller means being operable to engage the projecting portions of said articles and pass the thus engaged articles between the knife and roller portions thereof incident to extracting such articles through the hopper outlet while the knife portion of said means serves to sever said articles at a section parellel with their path of movement from the hopper, and means for operating said knife and roller means.

4. In a machine for treating longitudinal articles, a rotatable hopper polygonal in cross-section transversely of its rotational axis and having a plurality of outlets each of limited area to permit only the endwise passage of such articles, and said outlets being arranged in rows coincident with the apices of said hopper, the side walls of said hopper being disposed at substantially acute angles at said apices, and rib members arranged substantially perpendicularly to said apices upon the inner side of each of said walls.

5. The apparatus of claim 4 and wherein said ribs are also arranged spiricularly of the hopepr to enable them incident to rotation of the hopper to advance the articles axially thereof.

6. In a machine for slitting longitudinal severable articles, a rotatable hopper having a plurality of outlets spaced circumferentially of the hopper and adapted to permit endwise passage of said articles therethrough outwardly of said hopper, slitting mechanisms upon said hopper in association with each of said outlets, each of said slitting mechanisms including a roller and a disk knife complementally rotatably to engage and pass articles therebetween as they emerge from the associated outlet, and the knives being positioned sufficiently close to their respective rollers as to effect a longitudinal cut through the articles while passing between said knives and said rollers.

7. In a machine for slitting longitudinal severable articles, a hopper rotatable about a substantially horizontal axis, said hopper having a plurality of outlets spaced circumferentially thereof and adapted to permit endwise passage of said articles therethrough, slitting mechanisms upon said hopper in association with each of said outlets, each of said slitting mechanisms including a roller and a disk knife complementally rotatable in one direction to receive and pass articles therebetween when they emerge from the associated outlet and rotatable in the opposite direction to eject said articles therefrom backwardly through such outlet into the hopper, means for rotating said rollers and knives in the one direction during movement below the hopper axis and for rotating said rollers and knives in the opposite direction during movement above the hopper axis.

8. Apparatus as set out in claim 7 and wherein the rotating means for each of said slitting mechanisms comprises a pulley rotatable in opposite directions to cause the respective rotation of said rollers and knives in different directions, pulley drive means successively engageable with said pulleys for driving them in one direction while their associated roller and knife are below the axis of the hopper and succesively engageable with said pulleys for driving them in the opposite direction while their associated roller and knife are above the axis of the hopper.

9. In a machine for slitting longitudinal severable articles, a hopper rotatable about a substantially horizontal axis and including paired side wall sections converging to from V-shaped troughs with apices extending axially of the hopper, said hopper having a plurality of outlets each of which is adapted to permit the endwise passage therethrough of such articles, said outlets being arranged in rows coinciding with the apices of said troughs, slitting mechanism in association with each row of said outlets, each slitting mechanism including a shaft extending axially of said hopper, a plurality of paired spaced-apart disk knives mounted on said shaft and a roller provided with circumferential grooves spaced similarly and respectively receptive of said pairs of knives, said paired knives and grooves being in respective registry with the outlets in the associated row of outlets, said roller and knives being complementally rotatable to receive and pass articles therebetween when they emerge from the outlets, the grooves receiving the articles emerging from the outlet with which they are in registry and the knife pairs in said grooves affecting longitudinal cuts entirely through the articles throughout their length, means for rotating said hopper, and spaced-apart ribs interiorly of the hopper, said ribs being arranged spiricularly in such a manner as to advance articles axially of the hopper during the rotation.

10. In a mechanical movement for intermittently driving an operation performing mechanism, a rotatable holder for said mechanism, a pulley on said holder at a distance from the holder axis and rotatable about its own axis to drive said mechanism, a belt for rotating said pulley, and disposed more distantly from the holder axis than said pulley, a second belt for rotating said pulley in the opposite direction and disposed less distantly from the holder axis than said pulley, and means for rotating said holder to carry said pulley successively and operatively along respective sections of said belts.

WILLIAM E. URSCHEL.
JOE R. URSCHEL.